United States Patent
Shalev et al.

(10) Patent No.: US 10,437,748 B1
(45) Date of Patent: Oct. 8, 2019

(54) CORE-TO-CORE COMMUNICATION

(71) Applicant: Amazon Technologies, Inc., Seattle, WA (US)

(72) Inventors: Leah Shalev, Zichron Yaakov (IL); Adi Habusha, Moshav Alonei Abba (IL); Georgy Machulsky, San Jose, CA (US); Nafea Bshara, San Jose, CA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 14/983,291

(22) Filed: Dec. 29, 2015

(51) Int. Cl.
*G06F 13/40* (2006.01)
*G06F 13/16* (2006.01)

(52) U.S. Cl.
CPC ...... *G06F 13/1673* (2013.01); *G06F 13/4027* (2013.01)

(58) Field of Classification Search
None
See application file for complete search history.

(56) References Cited

U.S. PATENT DOCUMENTS

| | | | | |
|---|---|---|---|---|
| 5,375,215 A * | 12/1994 | Hanawa | ............. | G06F 13/1605 711/169 |
| 6,434,641 B1 * | 8/2002 | Haupt | ................ | G06F 12/0828 710/39 |
| 7,599,998 B2 * | 10/2009 | Galbraith | ............... | G06F 15/17 709/213 |
| 8,347,038 B2 * | 1/2013 | Sapronov | ............. | G06F 12/084 711/130 |
| 9,152,572 B2 * | 10/2015 | Ronen | ................. | G06F 12/1027 |
| 2003/0004949 A1 * | 1/2003 | Hong | ................ | G06F 17/30595 |
| 2005/0138249 A1 * | 6/2005 | Galbraith | ............... | G06F 15/17 710/100 |
| 2010/0042757 A1 * | 2/2010 | Yoshioka | ............... | G06F 13/28 710/33 |
| 2012/0079155 A1 * | 3/2012 | Damodaran | ...... | H03K 19/0016 710/244 |
| 2016/0342543 A1 * | 11/2016 | Bonzini | ................. | G06F 13/24 |

\* cited by examiner

*Primary Examiner* — Elias Mamo
(74) *Attorney, Agent, or Firm* — Klarquist Sparkman, LLP

(57) ABSTRACT

Apparatus, methods, and computer-readable storage media are disclosed for core-to-core communication between physical and/or virtual processor cores. In some examples of the disclosed technology, application cores write notification data (e.g., to doorbell or PCI configuration memory space accesses via a memory interface), without synchronizing with the other application cores or the service cores. In one examples of the disclosed technology, a message selection circuit is configured to, serialize data from the plurality of user cores by: receiving data from a user core, selecting one of the service cores to send the data based on a memory location addressed by the sending user core, and sending the received data to a respective message buffer dedicated to the selected service core.

20 Claims, 6 Drawing Sheets

CORE-TO-CORE COMMUNICATION

BACKGROUND

Use of virtual computing resources (e.g., multiple core systems and processors in a cloud computing environment) can provide a number of advantages including cost advantages and/or an ability to adapt rapidly to changing computing resource needs. Communication of data between cores based on ad hoc techniques leads to difficulties in coordinating communications and resources, especially when using shared memory resources. Accordingly, there is ample opportunity for improvements in core-to-core communication.

DETAILED DESCRIPTION

Apparatus, methods, and computer-readable storage media are disclosed herein for communication technologies that allow for core-to-core communication in a virtual or non-virtual environment including a number of source cores and one or more target cores. For example, the source cores can be application cores (e.g., a virtual processor core executing code in a user-level privilege mode) and the target cores can be service cores (e.g., a virtual processor core executing code in a supervisor-level privilege mode). In some examples, the source cores and/or target cores are physical processors that are not virtualized.

Use of disclosed core-to-core communication techniques with dedicated processors cores (e.g., virtual or physical general-purpose central processing unit (CPU) cores) can allow for improved use of processor resources. For example, caches can be made more efficient by avoiding cache pollution. The use of locks in implementing a shared service (e.g., an operating system service hosted by a service core) can be avoided. According to some examples of the disclosed technology, any suitable operating system service can be implemented as a shared service, including TCP, IP, device driver, memory access, storage device access, or other suitable services. Further, the disclosed technology allows for the avoidance of expensive context switches (e.g., from user context to kernel or hypervisor context), even when using shared services implemented by the operating system kernel or hypervisor. In some examples, a target core buffer is allocated to each operating system service and one or more target cores provide the designated service based on data read from the target core buffer.

In some examples of the disclosed technology, application cores write notification data (e.g., doorbell or PCI configuration memory space accesses), without synchronizing with the other application cores or the service cores. In some examples, a message selection circuit or message router maps a logged page into a non-cached memory address space of an application core. Core memory accesses to the logged page are sent to the message selection circuit or message router, which serializes the writes and sends them to a corresponding queue for input to the target core. In some examples, each of the target cores (e.g., a service core) polls a single memory location, or a queue, to receive messages from the target core's corresponding queue.

I. Example Core-to-Core Communication Computing Environment

Figure 1:
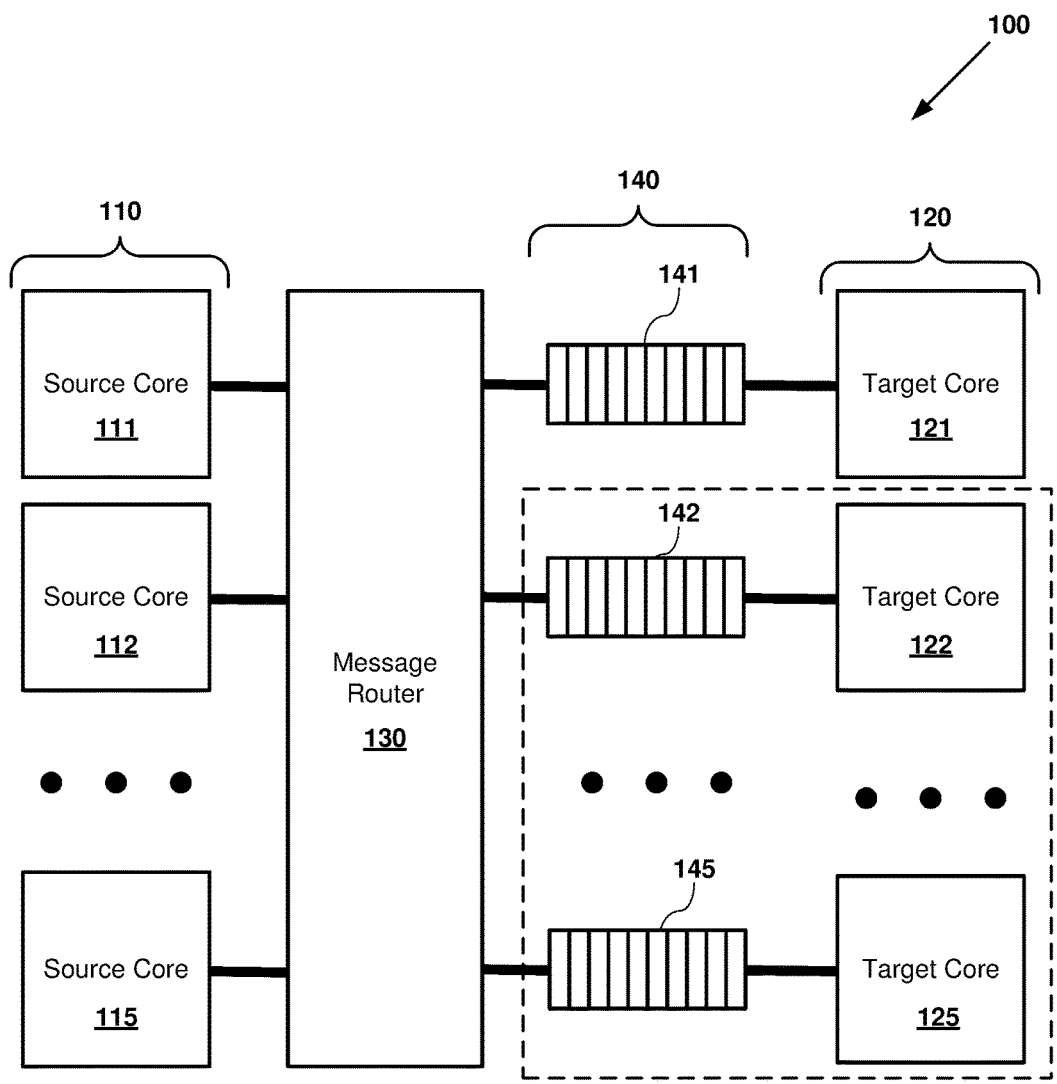
FIG. 1 depicts an example computing environment in which core-to-core communication can be performed according to certain examples of the disclosed technology.

FIG. 1 is a diagram of a computing environment in which core-to-core communication can be performed according to the disclosed technology. For example, the environment 100 can be a hardware environment or a virtual computing environment. In some examples, some or all of the components illustrated are arranged on a single integrated circuit. In some examples, some of the components are located on additional integrated circuits. In some examples, some of the components can be located on a distinct computing system and accessed using, for example, a computer network.

As shown in FIG. 1, a plurality of source cores 110, including source cores 111, 112, and 115 are coupled to a plurality of target cores 120, including target cores 121, 122, and 125. The source cores and target cores are coupled with a message router 130 that is configured to receive messages generated by any of the source cores and send the data to a selected one of the target cores via a respective buffer 141, 142, or 145 coupled to the respective target core. For example, the source cores can be connected to the message router via a memory bus interface. The source cores 110 can, for example, write data to the message router 130 by sending a destination address and associated data using memory-mapped output to a memory bus interface. Thus, intervening memory between the source cores 110 and message router 130 is not necessary. In some other examples, messages are sent to the message router 130 by one or more of the source cores 110 and gathering data. In some examples, messages are sent to the message router 130 via a doorbell signal or doorbell interrupt.

It should be noted that each of the cores (e.g., cores 111, 112, 115, 121, 122, and 125) can be a hardware core, a virtual core operating on a same physical core, or a virtual thread operating on a hardware core. It should be further noted that the source cores and target cores are not necessarily identical to each other. For example, each of the source cores can have an identical design and/or functionality as each of the target cores. In some examples, each of the source cores and/or target cores can have a different design and/or functionality than other cores of the plurality. Further, the computing environment 100 can provide additional functionality, including input/output, memory, clocking, cache, or other suitable functionality that is not illustrated in FIG. 1.

In some examples, the computing environment 100 is implemented such that the number of source cores and/or the number of target cores can be changed by reconfiguration during run time of the computing environment 100. For example, a control unit can determine that additional or fewer source cores, or additional or fewer target cores, should be allocated based on a current computing load and change the allocation accordingly. Further, it should be noted that the configuration of the computing environment including coupling between the cores, message router 130, buffers, and target cores is not necessarily fixed during manufacture of the corresponding integrated circuit, but can be in some examples reconfigured prior to or during run time of the computing environment 100. In some examples, a physical processor can be divided into a number of source cores and/or target cores by way of a virtual machine environment. For example, a hypervisor can provide an environment for multiple operating systems executing code assigned to each of the cores.

Each of the source cores can execute computer instructions for various application processes and threads and can selectively request that further computation be carried out by one or more of the target cores. The source cores can send messages via the message router 130 to the target cores.

Each of the target cores, in turn, has a single buffer dedicated for receiving messages from the message router 130. For example, the target core 121 can be coupled to a single buffer 141 which is, in turn, coupled to the message router 130; the target core buffer 141 provides requested data only to the target core 121. In other examples, there is a single target buffer allocated for each service, but the target data can be sent to more than one target core. Data from the target buffers is read upon request by one of the target cores.

The buffers can be implemented using, for example, a designation portion of general-purpose main memory or a locked area in a memory cache. In other examples, dedicated hardware resources provide the buffering. Examples of suitable hardware implementations of the buffers includes general purpose main memory (e.g., a main memory configured to implement a first-in, first-out buffer using a processor for control logic), chained flip-flops, or other suitable hardware configurations. Target cores can be configured in some examples to read data from the buffers in an asynchronous fashion with respect to the manner in which data is sent from the source cores to the message router 130, and/or the manner in which the message router writes data to the buffers.

In the disclosed computing environment 100, the source cores are configured such that they do not write data directly to the buffers of the target cores. Configuring cores to write directly to the same buffers would require implementation mechanisms to avoid contention, such as locks to enforce mutual exclusion concurrency control and/or contact switches (e.g., moving a processor between a user space to a supervisor space or vice versa). Such mechanisms typically slow down communication between the source cores and the target cores, and therefore can affect overall performance of the computing environment 100.

As shown in FIG. 1, the computing environment 100 also includes a message router 130 that is configured to detect and service write operations received from the source cores by receiving data sent by the source cores to one of the logged addresses. Thus, any of the source cores can send data to the message router at a designated memory location, but the target core receiving the data can be obscured to the source core. The address and data are serialized by the message router 130. In some examples, there is a single target core 121 and a single buffer 141. In such cases, the message router 130 sends received data to the target core buffer 141. Optionally, as indicated by the dashed line, two or more target cores can be provided in the computing environment 100, and hence, each target core has a corresponding target core buffer.

It should be noted that data can be sent to the message router 130 by a respective source core writing to a virtual memory address that is translated to a physical memory address before being read by the message router 130. It is often desirable that the virtual address is a non-cached memory address. Writes to the virtual address can be achieved using, for example, mapping of virtual addressees performed by hypervisor and/or operating system code performing configuration of a memory management unit (MMU) operable to write routes to the message router 130 using, for example, lookup table address translation. In some examples, one or more of the source cores are configured to write messages to an identical virtual address, which is in turn translated to a different physical memory address that is used by the message router 130. Thus, each of the source cores can write data to the virtual memory address, while being unaware of potential collisions between writes from other source cores.

The message router 130 can send message data to each of the buffers in a first-in, first-out (FIFO) order, but other buffer management schemes can also be implemented. For example, the message router 130 can prioritize some messages received from the source cores over other messages. Examples of prioritization can be based on, for example, without limitation: the order in which messages are received, a priority associated with the address range accessed by the corresponding source core, content or type of data contained in the source core messages, or other suitable priority schemes. It should be noted that the computing environment 100 can be implemented as a single continuous semiconductor integrated circuit die. For example, a single integrated circuit can include the source cores, target cores, message router, and embedded DRAM for the target buffers. In other examples, some of the components may be located on a different semiconductor die, for example in a stacked die package, a multi-chip module via an interposer, coupled on a printed circuit board, or even accessed via a network connection. For example, a single integrated circuit can include the message router, source cores and/or target cores, and the target buffer is contained in a separate set of DRAM chip(s). The message router 130 can be also implemented as a PCIe card, while both source and target cores are implemented as a single chip.

Each of the source cores 110 can be coupled to the message router, the message router 130 can be coupled to the buffers 140, and the buffers in turn coupled to the target core via one or more memory buses.

For example, data to the message router 130 can be sent as a synchronous or asynchronous electrical signals by one of the source cores 110 using a memory bus interface. The sending source core writes data to the memory bus interface at one or more designated addresses. The message router 130 is configured to receive data from the memory bus interface. In some other examples, the source cores can signal an interrupt using a software interrupt. In some examples, hardware interrupts can be employed and the interrupts sent using a dedicated signal line or memory mapped I/O. In some examples, the interrupt can be a message-signaled interrupt, for example as in the PCI Express bus standard, although other examples of message signaled interrupts can be used. In some examples, a doorbell interrupt is used. In such examples, the source core signaling the interrupt can store data for a message in a designated memory location, and then signal the interrupt itself by storing a specified set of data in an interrupt memory location. For example, the message router 130 can detect the interrupt by polling the designated interrupt memory location for changes and/or a designated value to be stored. Once the designated value has been detected, the message router 130 can optionally lock the interrupt by writing another designated value to the doorbell interrupt memory location, process the interrupt, and then clear the interrupt by writing another designated value to the doorbell interrupt location.

For ease of explanation, the core-to-core communication disclosed herein is described using examples of messages that are sent from source cores (e.g., application cores) to target cores (e.g., service cores). However, it should be noted that bi-directional communication can be enabled in some examples, by providing additional queues and configuring the message router (or a second message router) to also send messages from the target cores to the source cores in a similar fashion (e.g., where the data is buffered in a FIFO accessible by the respective receiving core).

II. Example Method of Core-to-Core Communication

Figure 2:
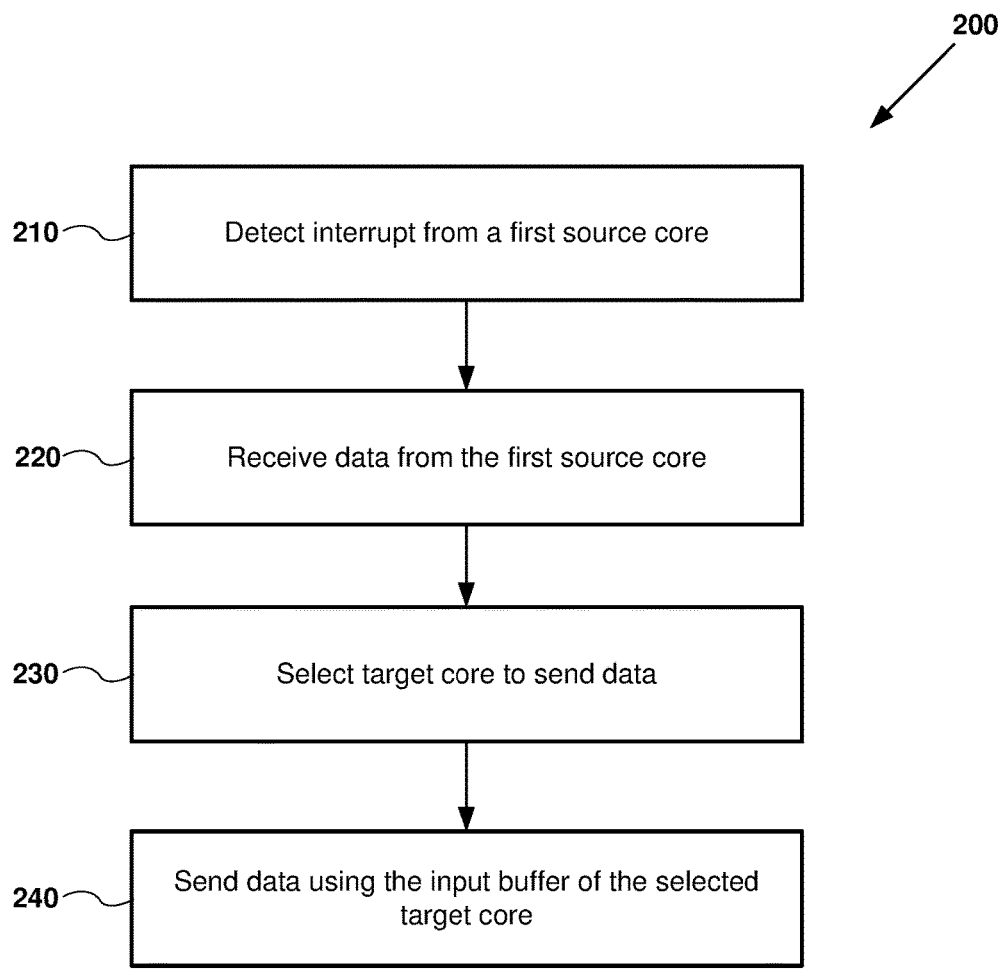
FIG. 2 is a flowchart outlining an exemplary method of performing core-to-core communication operations as can be performed according to certain examples of the disclosed technology.

FIG. 2 is a flowchart 200 outlining an exemplary method of performing core-to-core communication operations as can be performed according to the disclosed technology. For example, the method depicted in FIG. 2 can be performed using the computing environment 100 of FIG. 1 or the processor 300 discussed in further detail below regarding FIG. 3. As will be readily understood to one of ordinary skill in the relevant art, the method of FIG. 2 can be performed in virtual or physical environments including those with virtualized processors, or device emulation.

At process block 210, a write access from a first source core is detected. For example, the message router 130 can detect a data and address message signaled by the first source core. For example, a source core can write a value to a designated memory location associated with the source core, and additional data associated with a message is accessed by the message router 130 using a memory interface protocol. Upon detecting the message, the method proceeds to process block 220.

At process block 220, the message router 130 receives data and a memory address from the first source core. The message router 130 maps the memory address to a target core buffer using, for example, a routing table stored in a memory local to the message router. Upon receiving the data, the method proceeds to process block 230.

At process block 230, a target core is selected to send the received data. In examples where there is one target core available, the method will send the data to that single target core. In examples where there are multiple target cores, the target core can be selected using a number of different techniques. For example, based on pre-configured memory address windows, each window is associated with a particular FIFO buffer location. In some examples, the target core can be selected randomly (e.g., from a set of target cores offering similar functionalities) or other techniques can be used. It should be noted that in some examples, the target core may be selected before the data is received at process block 220. After selecting the target core to send data, the method proceeds to process block 240. In some examples, data can be multicast to a plurality of the target cores by the message router 130 copying data to two or more of the buffers 140. For example, the message router 130 can select data written to a specified address range associated with multicast (e.g., a designated multicast address) and send the data to a plurality of the buffers 140.

At process block 240, data is sent to the input buffer of the selected target core. For example, the message router 130 can write the data to any of the buffers depicted in FIG. 1. If target core 125 is selected, then the message router will send data to message buffer 145. It should be noted that in some examples, each of the buffers receives data for a single service, but the service can be performed by one or more of the target cores. Further, the target cores can be configured to read data from the buffers in a manner that is asynchronous relative to the manner in which data is written by the source core and/or received by a message router.

III. Example Core-to-Core Communication Processor

Figure 3:
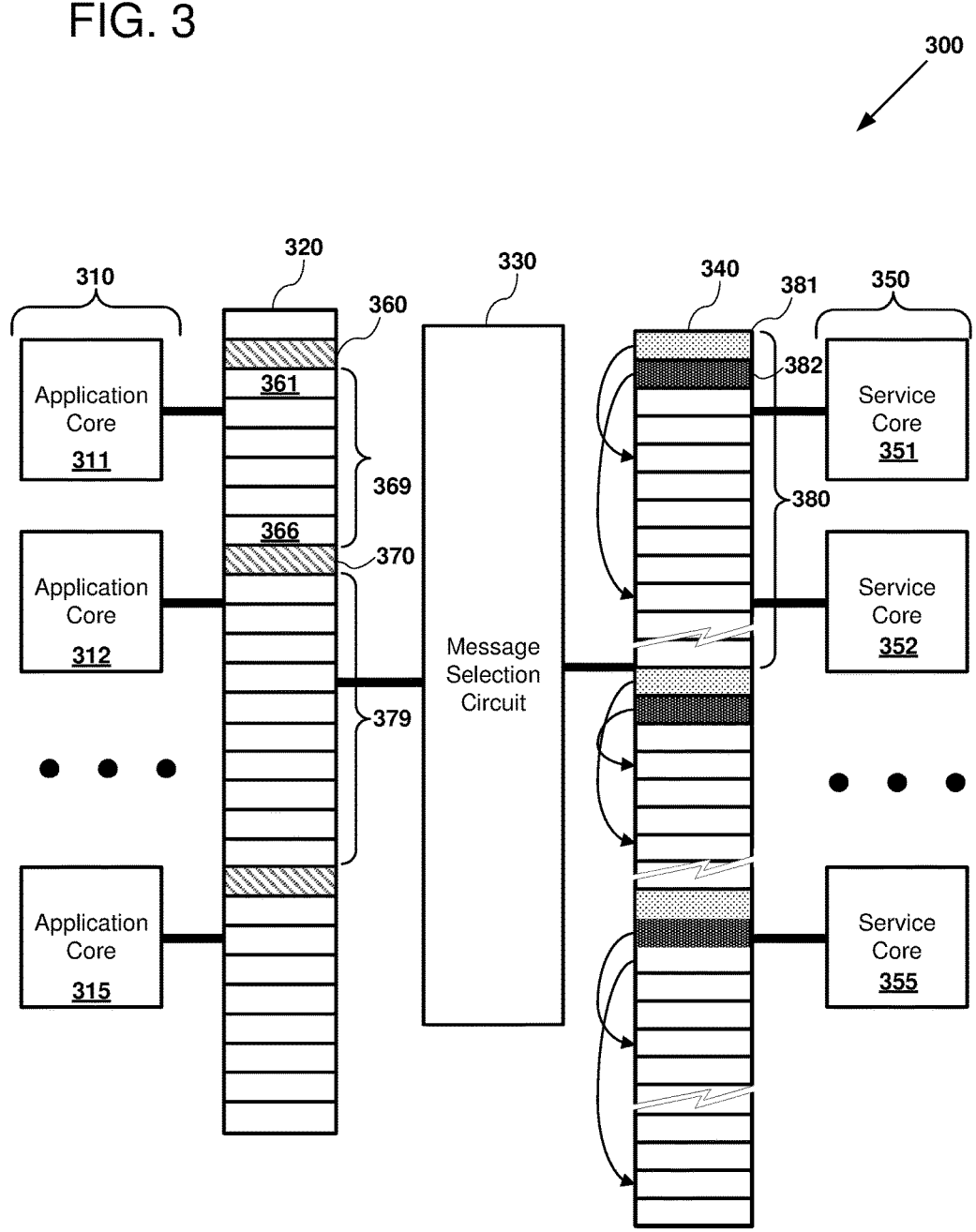
FIG. 3 is a diagram that depicts an example processor in which certain examples of the disclosed technology can be implemented.

FIG. 3 is a diagram that depicts an example processor 300 in which certain examples of the disclosed technology can be implemented. For example, the computing environment 100 depicted in FIG. 1 can be implemented using the depicted processor 300, although other implementations can be used as well. As shown in FIG. 3, a plurality of application cores 310, including application cores 311, 312, and 315, are coupled to a memory-mapped address space via at least one memory interface 320. The memory interface 320, in turn, is coupled to a message selection circuit 330. The output of the message selection circuit is coupled to a memory 340. The output of the memory 340 is coupled to a plurality of service cores 350, including service cores 351, 352, and 355, and the memory can send data to one or more of the service cores. In some examples, all of the service cores 350 can read data from any portion of the memory. For example, the memory 340 can be a portion of physical main memory. In other examples, the memory 340 is distributed, and portions of the memory can only be read by a subset of the service cores 350. In some examples, each of the service cores 350 can poll the memory 340 to determine whether there is data in the message buffer to be processed. In other examples, additional circuitry in the message selection circuit 330 raises a signal received by one of the service cores 350, which in turn proceeds to read data from the appropriate target message buffer stored in the memory 340.

Each of the application cores (e.g., application core 310) can send data to the message selection circuit 330 by addressing and writing data to the memory interface 320. As shown, the application core 311 can send data by writing to a designated memory location 360 in the memory interface 320 address space. The application core 311 can write data to a number of words of the memory, for example, memory location 361 or memory location 366, within a range 369 of memory locations as shown. Similarly, the application core 312 can send data by writing to a designated memory location 370 and write data to any of the memory locations within its associated designated range 379 of memory locations. In some examples, the application cores write to a virtual memory address in order to send data, which in turn is translated to a physical address in the shared memory 340. The message selection circuit 330, in turn, can detect data from the application cores by polling or trapping writes to the designated locations (e.g., memory locations 360 or 370) using the memory bus interface protocol. In some examples, memory accesses by the application cores to the first shared memory are detected and trapped by a hypervisor executing on a processor (e.g., a processor implementing the message selection circuit 330).

Responsive to detecting the memory write(s), the message selection circuit 330 analyzes the data value to the memory interface and/or one or more data fields received by a write within the designated memory range (e.g., memory range 369 or memory range 379) in order to select a target service core. The memory 340 includes a number of FIFO buffers.

For example, the first service core 350 is associated with a first FIFO buffer 380. The first FIFO buffer 380 includes a pointer to the head of the queue 381, and a pointer to the tail of the queue 382, each of which in turn indicates a memory location within the buffer 380 that corresponds to the next location to write to the buffer, and the next location to read data from. As data is written to the buffer 380, and read from the buffer, the value stored for the head and queue 381 and 382 are updated accordingly. Thus, the memory 340 can implement a FIFO buffer, without the use of dedicated hardware. Circuitry implementing the memory interface 320 bus protocol can be used to arbitrate simultaneous writes to the memory interface. In some examples, the memory interface 320 is implemented using dedicated hardware for a PCIe, HyperTransport, QuickPath Interconnect, Infini-Band, or other suitable memory bus interface. In some examples, the memory 340 can be implemented using dynamic ram (DRAM), embedded DRAM (eDRAM), static ram (SRAM), flash memory, or other types of volatile or nonvolatile memory depending on, for example, the design requirements of the particular processor 300.

IV. Example Environment Including Device Emulation and Paravirtualization

Figure 4:
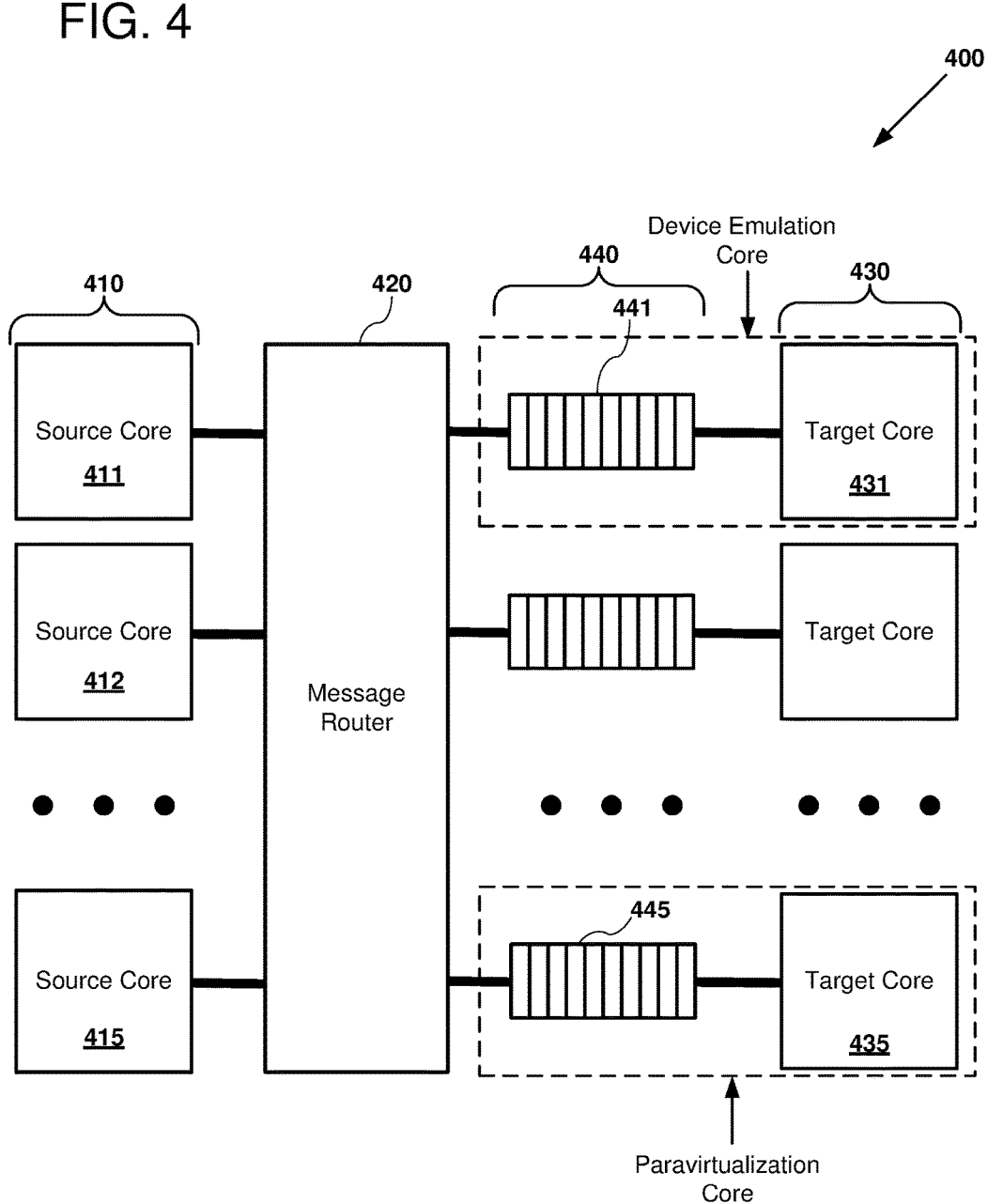
FIG. 4 is a diagram illustrating an example of a computing environment in which device emulation and paravirtualization can be performed according to some examples of the disclosed technology.

FIG. 4 is a diagram illustrating an example of a computing environment 400 in which device emulation and paravirtualization can be performed according to the disclosed technology. For example, certain examples of the computing environment 100 discussed above regarding FIG. 1 or the processor 300 described above regarding FIG. 3 can be adapted for implementing such device emulation and/or paravirtualization techniques. In some examples, the environment 400 implements device emulation, paravirtualization, or both device emulation and paravirtualization.

As shown in FIG. 4, a number of source cores 410 are coupled to communicate to a message router 420 as discussed further above regarding message router 130 and message selection circuit 330. The message router, in turn, is coupled to a set of target cores 430, each of which is coupled to an associated target core buffer 440. The target core buffer can be implemented using, for example, shared memory, dedicated hardware buffers, or other suitable technology. Similar to the configurations discussed above, each target core has a dedicated target core buffer that is not read by the other target cores in the environment.

In the diagram of FIG. 4, a first target core 431 is coupled to a corresponding target core buffer 441, and the target core 431 is further configured to perform device emulation. In device emulation, software executed by a host processor core can be configured to use a software driver, even though the actual hardware corresponding to the software driver does not exist. The missing hardware can be emulated using emulation software that is executed by the same or a different processor core. In examples where devices are emulated using a single core, then the processor operates in a guest mode where it behaves as if the missing hardware exists, and when the hosting processor core is to perform and operation that is not enabled, an exception is raised and the processor switches to operate in supervisor mode. Such switching between guest mode and supervisor mode and vice versa can be expensive in terms of computational resources and latency.

In the example of FIG. 4, the target core 431 is configured to operate in supervisor mode and one or more of the source cores 410 are configured to operate in user mode. Thus, neither the source core (e.g., source core 411), nor the target core 431 will need to switch context (e.g., from user level of privilege to supervisor level of privilege, or vice versa) while enabling device emulation by the target core 431. For example, a first source core 411 can execute software, including software written to interact with a peripheral component routing controller (e.g., a PCI (Peripheral Component Interconnect), or PCI Express (PCIe) device) and to write to PCI configuration space in order to interact with the device. For example, the source core 411 can write a PCI configuration space write request to a dedicated non-cache memory address. In other examples, the source core 411 can be configured to selectively write a PCI configuration space write request upon a condition in which an action that cannot be executed by the source core can be performed.

The message router 420 can monitor a shared memory to which the source core 411 writes such write requests (e.g., by polling one or more memory locations) and send data for such requests to a selected one of the target cores 430. In the example shown, the message router 420 can send data to the target core 431, which has been configured to emulate a hardware device (e.g., a peripheral such as a printer, a scanner, or other hardware) via the target core buffer 441. Thus, the source core 411 can remain in user mode while the target core 431 receiving messages remains in supervisor mode, thereby avoiding a context switch. In some examples, two or more of the source cores 410 can write to a target core that is emulating a hardware device. For example, the hardware device can be an emulated PCIe device or can be single root I/O virtualization (SR-IOV) device, which can expose multiple virtual functions. Different virtual machine instances can access separate virtual functions or services, using separate addresses within a range associated with the target FIFO belonging to the emulated device's core. For example, both the source core 411 and the source core 412 can perform PCI configuration write requests to a designated memory address in a shared memory. In some examples, each of the cores is configured to write to a different address. In other examples, each of the source cores writes to the same virtual address which is translated to a different physical address. The message router 420 receives data sent by each of the source cores and routes it to the appropriate target core that is performing the device emulation.

Also shown in the environment 400 of FIG. 4 is a paravirtualization scenario. In the illustrated paravirtualization example, a core executing a user operating system uses a driver specifically designed for hypervisor-based emulation. Thus, operations can be sent to another core for performance. For example, a paravirtualization system can provide hooks that allow user and supervisor requests to be transmitted and received and to acknowledge tasks that otherwise would be executed in the virtual domain.

In the environment 400 shown, paravirtualization can be implemented by having one or more of the source cores (e.g., source core 415) execute a paravirtualization request for a device (e.g., a PCI device) and to write to a dedicated shared memory address request for execution in a non-virtualized context. The message router 420, in turn, sends data for the paravirtualization request to a selected target core (e.g., target core 435) using the target cores associated with buffer 445.

Figure 5:
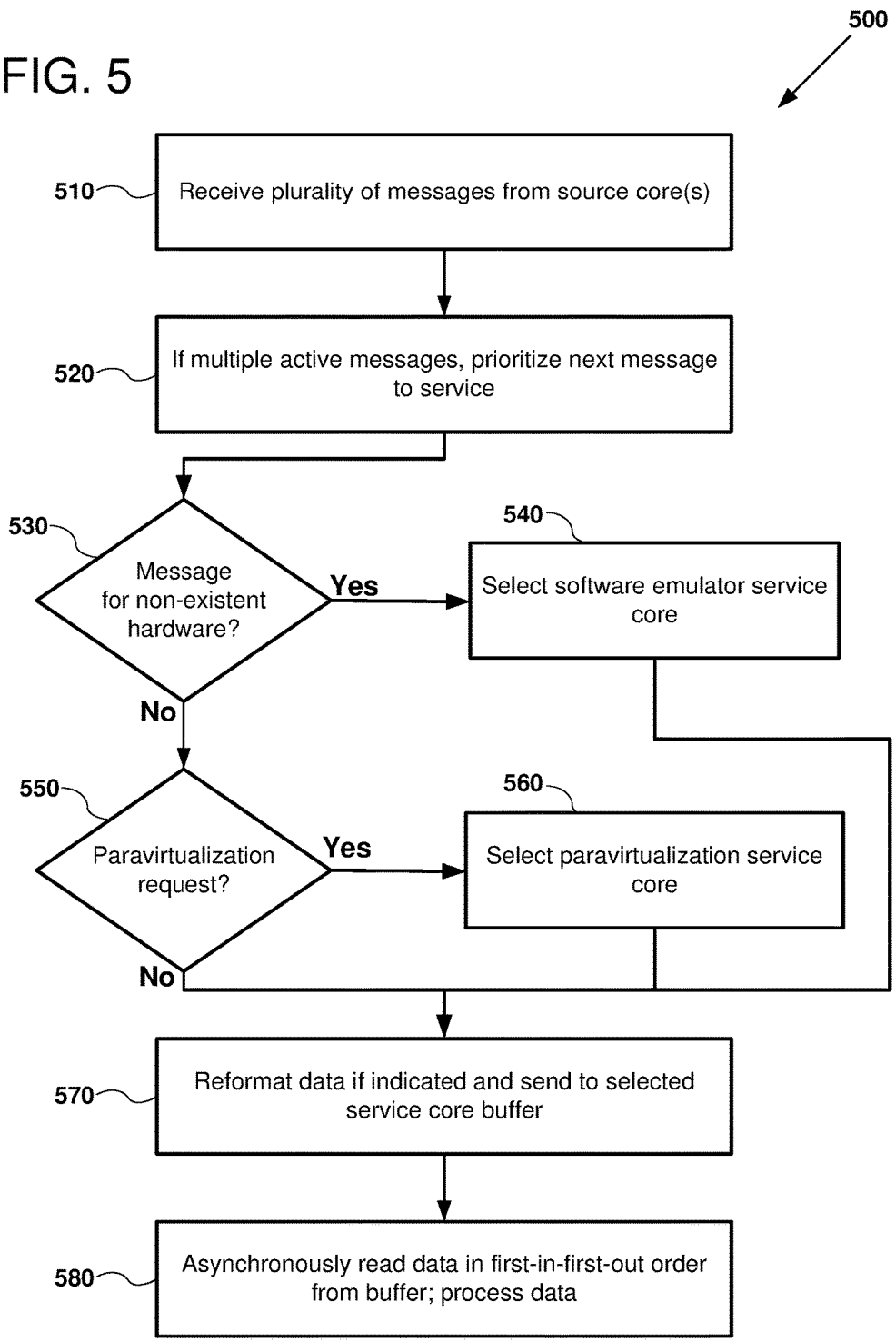
FIG. 5 is a flowchart outlining an example method of implementing device emulation and paravirtualization, as can be performed according to certain examples of the disclosed technologies.

V. Example Method of Core-to-Core Communication with Virtualization and Device Emulation FIG. 5 is a flowchart 500 outlining an example method of implementing device emulation and paravirtualization, as can be performed according to the disclosed technologies. For example, the environment 400 described above regarding FIG. 4 can be used to implement either or both device emulation and paravirtualization.

At process block 510, a plurality of messages from one or more source cores are received by a message router. For example, any suitable memory bus interface technique, including doorbell interrupts, can be used to receive the messages from the source core.

At process block 520, if multiple active messages have been received, a next message selected from the set of multiple active messages is selected according to a prioritization scheme. For example, messages can be processed in the order received, according to a priority level associated with the message, according to the identity of the sending source core or a corresponding target core, at random, round robin, or in other suitable fashions. In some examples, messages can be prioritized according to whether the message is for device emulation, or paravirtualization. Once a message has been selected, the method proceeds to process block 530 where it is determined whether the message indicates a call to nonexistent hardware (e.g., a device to be emulated). If a message sent via a memory write to nonexistent hardware is detected, the method proceeds to process block 540. Otherwise, the method proceeds to process block 550.

At process block 540, a target core (e.g., a service core) is selected to send device emulation data. For example, if a doorbell interrupt is detected at a particular memory location associated with device emulation, then the method can select the target core corresponding the memory location. In some examples, a message router can analyze at least a portion of data for a message received from the source core to determine if the message is for a memory location for hardware that does not actually exist. Once a software emulator service core for emulating missing hardware is detected, the method proceeds to process block 570.

At process block 550, it is determined whether a request associated with the selected message to a target core (e.g., a service core) is a paravirtualization request. For example, if a doorbell interrupt is detected at a particular memory location associated with paravirtualization, then the method can select the target core corresponding the memory location. In some examples, a message router can analyze at least a portion of data for a message received from the source core to determine if the message is for a paravirtualization request. Once a software emulator service core for emulating missing hardware is selected, the method proceeds to process block 560.

At process block 560, a target core (e.g., a service core) is selected to receive the paravirtualization request. In some examples, the target core is selected based on a mapping of cores to memory addresses for which the request is received (e.g., a memory table can store the mapping). In some examples, a message router can analyze at least a portion of data for a message received from the source core to determine if the message is for a paravirtualization service. Once a software emulator service core for servicing the paravirtualization request is detected, the method proceeds to process block 570.

At process block 570 data received from the source core for the currently processed message is reformatted, if needed, and sent to the service core buffer associated with the selected target core, which was selected at process block 540 or 550. Examples of reordering can include, adjusting positions of fields in memory, changing endianness of the data, performing filtering or transform operations on the data, or other suitable reformatting manipulations. If the message does not correspond to device emulation or paravirtualization, similar techniques as those discussed above for FIG. 2 regarding process block 230 can be applied to select the target core. The data, whether or not it is reformatted, is sent to the selected target core by sending data to a queue that can be accessed by the receiving core. After the data is sent to the selected target core buffer, the method proceeds to process block 580.

At process block 580, data from the queue that was written at process block 570 can be read-out in an asynchronous order. For example, the target core queue can be stored in a multi-ported memory or array of flip-flops that can be used to read data independently of the data received with the message data at process block 510.

VI. Example Computing Environment

Figure 6:
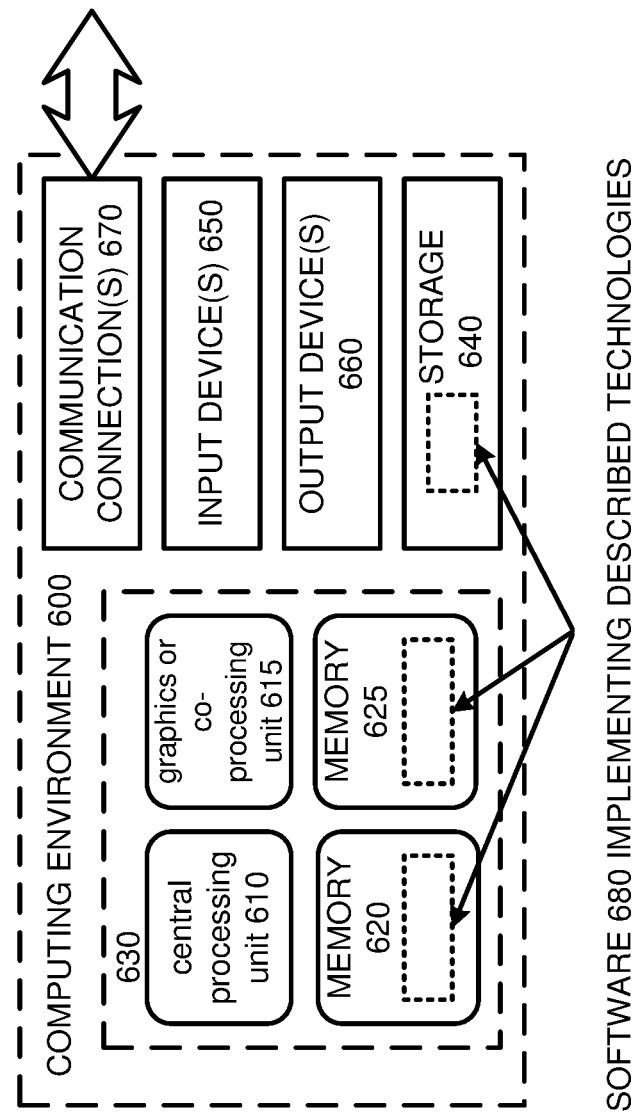
FIG. 6 depicts a generalized example of a suitable computing environment in which certain examples of the described innovations can be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.)

With reference to FIG. 6, the computing environment 600 includes one or more processing units 610, 615 and memory 620, 625. In FIG. 6, this basic configuration 630 is included within a dashed line. The processing units 610, 615 execute computer-executable instructions, including instructions for implementing core-to-core communication operations. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). In addition, the memory 620, 625 can be used for storing data for use with core-to-core communication methods disclosed herein.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples and should not be taken as limiting the scope of the claimed subject matter. Rather, the scope of the invention is defined by the following claims. We therefore claim as our invention all that comes within the scope of these claims.

What is claimed is:

1. An apparatus configured to communicate data between user cores and system cores in a physical or virtual multi-processing environment via a message selection circuit, the apparatus comprising:
   two or more user cores, each of the user cores being coupled to the message selection circuit and being configured to send data to the message selection circuit via a memory interface;
   two or more service cores, each of the service cores being coupled to a respective message buffer; and
   the message selection circuit, configured to, responsive to detecting data sent via the memory interface by one of the user cores:
      based on a non-cached memory address selected by the one user core, select one of the service cores to send the data to, and
      send the data to the respective message buffer of the selected service core,
   wherein the selected service core provides device emulation services or paravirtualization services to the one user core based on data received from the message buffer.

2. The apparatus of claim 1, wherein the one user core sends the data via one or more addresses by sending a write transaction to the memory interface.

3. The apparatus of claim 1, wherein the one user core sends the data using a doorbell interrupt by sending a write transaction to the memory interface.

4. The apparatus of claim 1, wherein at least one of the user cores is executing in a user level of privilege on a processor, and wherein at least one of the service cores is executing in a supervisor level of privilege on the processor.

5. The apparatus of claim 1, wherein the respective message buffer is a first-in-first-out (FIFO) buffer, and wherein the message selection circuit appends the data to the respective message buffer of the selected service core.

6. An apparatus for routing messages between processor cores, the apparatus comprising:
  memory;
  one or more source cores, each of the source cores being coupled to a message router via a memory interface, the message router being coupled to the memory;
  one or more target cores, each of the target cores being coupled to read data from a respective target buffer in the memory; and
  the message router, the message router being configured to:
    receive from one of the source cores, via the memory interface, a destination memory address and message data, the destination memory address being a non-cached memory address;
    select one of the target cores based on the destination memory address; and
    send the message data to the target buffer coupled to the selected target core, wherein the selected target core provides device emulation services or paravirtualization services to said one of the source cores based on the message data.

7. The apparatus of claim 6, wherein the message router is further configured to raise an interrupt with at least one of the target cores to indicate that the message data is available for reading from the memory by the at least one target core.

8. The apparatus of claim 6, wherein the source cores send data to a selected one of the one or more target buffers via the memory interface by appending the data to the selected target buffer.

9. The apparatus of claim 6, wherein the message router is configured to serialize data from the source cores by prioritizing messages based on: an address range written to by the source core, a time period during which the message data was received, an identity of the sending source core or the corresponding target core, at random, round robin, whether the message data is for device emulation, or whether the message data is for a paravirtualization request.

10. The apparatus of claim 6, wherein at least some of the message data is sent by storing data at a respective physical memory location associated with a source core.

11. The apparatus of claim 6, wherein there are two target cores, and wherein the two target cores read data from the same target buffer.

12. The apparatus of claim 6, wherein each of the target buffers is associated with a different respective operating system service, and wherein each of the target cores is configured to perform operations for the operating system service associated with the target buffer coupled thereto.

13. The apparatus of claim 6, wherein at least some of the message data is sent by storing data at a respective virtual memory address for each of the source cores, each of the respective virtual memory addresses corresponding to a physical memory address associated with the target buffer coupled to the selected target core.

14. The apparatus of claim 13, wherein each of the respective virtual memory addresses is the same virtual memory address.

15. The apparatus of claim 6, wherein the apparatus is a processor, a system-on-chip (SoC), a field-programmable gate array (FPGA), or an application-specific integrated circuit (ASIC).

16. A method of communicating data between source cores and target cores, the method comprising:
  receiving first data and a first destination address sent by a first one of the source cores via a memory bus, the first destination address being a non-cached memory address;
  responsive to the receiving the first data, selecting one of the target cores to send the received first data to based on the first destination address; and
  sending the received first data to the selected target core using an input data buffer coupled to the selected target core,
  wherein the selected target core provides device emulation services or paravirtualization services to the first one of the source cores based on the first data.

17. The method of claim 16, further comprising:
  receiving second data and a second destination address sent from a second one of the source cores, the second destination address being the same as the first destination address; and
  storing the first data and the second data in different locations in the same input data buffer.

18. The method of claim 16, wherein the first destination address is a designated multicast address, the method further comprising:
  sending the first data to a second input data buffer based on the first destination address being the designated multicast address, the second input data buffer being coupled to another one of the target cores.

19. The method of claim 16, wherein the first one of the source cores is an application core and the selected target core is a service core.

20. The method of claim 16, further comprising:
  operating the input data buffers by storing values, a head pointer, and a tail pointer to perform queuing operations in an addressable memory circuit.

* * * * *